UNITED STATES PATENT OFFICE.

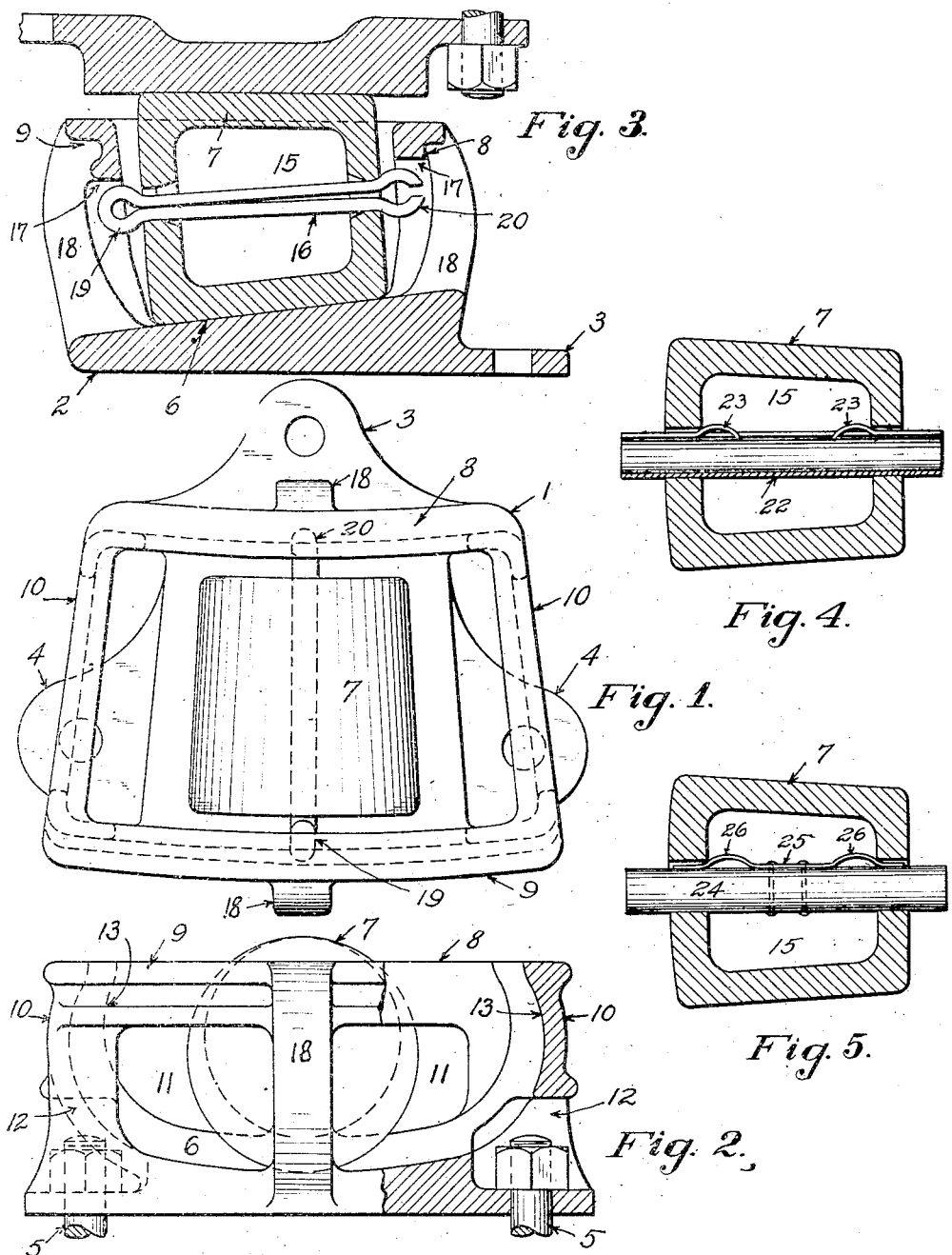

ARNOLD STUCKI, OF PITTSBURGH, PENNSYLVANIA.

ROLLER SIDE BEARING.

1,056,230.          Specification of Letters Patent.      Patented Mar. 18, 1913.

Application filed September 19, 1911. Serial No. 650,244.

*To all whom it may concern:*

Be it known that I, ARNOLD STUCKI, a resident of Pittsburgh, in the county of Allegheny and State of Pennsylvania, have invented a new and useful Improvement in Roller Side Bearings, of which the following is a specification.

This invention relates to side bearings for railway cars.

The object is to provide a bearing which is efficient and practically frictionless and which performs all of the other necessary functions of side bearings, which is very simple and therefore inexpensive both as to first cost and subsequent repair, which is lasting in service, which preferably travels radially and returns in a radial path to central position whenever the body bolster is raised, and which is provided with simple and easily removable means for preventing the roller from escaping from the housing in case of wrecks or other abnormal conditions.

The invention comprises a side bearing constructed and arranged as hereinafter described and claimed.

In the accompanying drawing Figure 1 is a plan view of the bearing; Fig. 2 is in part a side view and in part a vertical section thereof; Fig. 3 is a vertical section longitudinally of the axis of the roller; and Figs. 4 and 5 are sectional details showing modifications.

In the drawing the side bearing is shown adapted for a tapering truck bolster, but it can be readily adapted to a straight truck bolster and to receive either a straight or tapering body bolster.

The side bearing comprises a suitable frame or housing 1 having its lower face 2 shaped to fit the type of bolster to which it is to be applied, being shown as adapted for a straight bolster. The housing is provided with an inwardly projecting flange 3 and a pair of laterally projecting flanges 4 provided with holes for receiving bolts 5 or rivets for connecting the bearing to the bolster. The bottom of the housing forms a bearing surface 6, the edges of which are formed on an arc struck from the center plate or king pin as a center, as shown in Fig. 1. Rolling on the bearing surface 6 is a conical roller 7 tapered to form a frustum of a cone whose apex is the center of the center plate or king pin. The bearing surface 6 and roller 7 are preferably smooth and plain in order to reduce friction and wear. The bearing surface is of considerable width and the roller of considerable length, to afford sufficient resistance against the pounding action of the body bolster, which is considerable, since side bearings of this class frequently have a material amount of clearance. The roller is of very large diameter so as to provide more than a mere line of contact, and increase the bearing surface and reduce the rolling friction to a minimum. The conical shape of the roller is particularly adapted to travel without friction on the arc shaped bearing surface, thereby avoiding all necessity of sliding radially, which would not only cause much friction, but also flatten the roller.

The housing is provided with suitable barriers, webs or walls, preferably of skeleton or open construction, to confine the roller and prevent it escaping from the housing under normal operating conditions. As shown, the housing has the upwardly projecting inside web or wall 8, outside web or wall 9 and end walls or webs 10. The inside and outside webs or walls are provided with openings 11 extending down to the bearing surface 6 and the end walls or webs are also provided with openings 12 also extending down to the bearing surface 6 so that a pocket is avoided and any dirt which gets into the bearing immediately passes out through one of these openings. These openings are very large so that the housing becomes in effect a skeleton cage with the barriers supported by six posts or columns. The end walls or webs are so shaped as to form stops for the roller, having their upper portions substantially vertical and preferably curved to the contour of the roller, as shown at 13, and form broad contacting surfaces for the roller.

The bearing surface 6 curves or is inclined upwardly from its center toward its ends, so that when the bolsters separate sufficiently to release the roller it rolls back to central position. These bearing surfaces may, if desired be formed by a hardened steel plate inserted in the cast metal of the housing.

The walls or barriers of the housings project upwardly beyond the center of the roller and are of sufficient height to prevent the roller from escaping under all normal conditions of service. To prevent the roller from escaping in case of wrecks or other abnormal conditions I extend through the roller a suitable member adapted to project beyond the ends of the roller and underlie portions of the inside and outside walls or barriers. This member is such as to be readily removable in order to permit of the removal of the roller from the housing whenever desired. Such member may take a variety of forms.

In Figs. 1 to 3 the roller is shown hollow and provided with an axial opening 15 extending therethrough and receiving a spring cotter 16 whose ends extend beyond the ends of the roller and underlie the portions 17 of the inside and outside webs. The central posts or columns 18 of the inside and outside webs are offset outwardly in order to permit the projecting ends of the cotter to pass when the roller travels to and fro on the bearing surface 6. This cotter is substantially of the shape of an ordinary spring cotter with its closed end or eye 19 projecting at one end and its free ends 20 projecting beyond the other end of the roller. The free ends are so shaped that when driven through the roller they do not catch onto the side of the hollow portion thereof, but if desired the openings 15 through the ends of the roller may be slightly tapered, as shown, to prevent the ends of the cotter pin catching. Whenever it is desired to remove the roller the cotter pin can be either driven out or pulled out with a pair of pincers.

Fig. 4 shows a modification wherein there is inserted through the roller a tubular member 22 split on one side and provided with a pair of resilient curved tongues 23 so shaped that they readily permit the member 22 to be either driven into or out of the roller, and when in position in the roller prevent its escape therefrom.

Fig. 5 shows still another modification in which a pin 24, either solid or hollow, is inserted in the roller and is of sufficient length to project beyond both ends thereof. Suitably secured to this pin is a member 25 having the bent spring portions 26 which, when the pin is in normal position, lie inside of the end walls of the roller and not only center the pin 24 but also prevent it from escaping.

Various other forms of members inserted in or through the roller and arranged to prevent the roller from escaping from the housing under abnormal conditions will readily suggest themselves to those skilled in the art.

The bearing described is of very simple construction, avoids all pockets in which dirt can accumulate, is inexpensive both as to first cost and subsequent repair, is very lasting on account of the large and substantial character of its parts, and is of such a nature that the roller cannot escape either under normal conditions of use or in case of wrecks or other abnormal conditions and therefore cannot become lost. The parts nevertheless are so constructed that the roller can be readily removed whenever desired for purposes of repair or renewal. The roller is of sufficient size to practically overcome all friction in rolling, while the shape of the ends and of the inside and outside webs or skeleton walls of the housing prevent friction at the ends of the roller. The large size of the roller both as to diameter and length makes the device nearly frictionless, as well as very lasting. The roller is free to travel in the housing under all changes of angular relation between the bolsters and can roll back to central position whenever the bolsters separate.

What I claim is:

1. A side bearing for railway cars comprising a housing adapted to be secured to the lower bolster, said housing being an integral member provided with side and end retaining barriers and having its bottom forming a bearing surface, a roller in said housing free to roll on said bearing surface, said side and end retaining barriers extending upwardly beyond the axis of said roller and being connected to the bottom by posts or columns to provide large openings at the level of the bearing surface, and a member removably extending axially through the roller and having portions extending beyond the ends of the roller and underlying portions of the inside and outside barriers.

2. A side bearing for railway cars comprising a housing adapted to be secured to the lower bolster, said housing comprising a rigid member provided with side and end retaining barriers and having its bottom forming a bearing surface, a roller in said housing free to roll on said bearing surface, and a member extending axially through the roller and beyond the ends thereof and underlying portions of the inside and outside webs or barriers and provided with resilient portions engaging the roller and serving to retain said member in the roller.

3. A side bearing for railway cars comprising a housing adapted to be secured to the lower bolster, said housing comprising a rigid member provided with side and end retaining barriers and having its bottom forming a bearing surface, a roller in said housing free to roll on said bearing surface, and a spring cotter extending axially through the roller with its ends projecting beyond the ends of the roller and underlying portions of the inside and outside barriers.

4. A side bearing for railway cars comprising a housing adapted to be secured to the lower bolster, said housing comprising a rigid member provided with side and end retaining barriers and with its bottom forming a bearing surface, the side barriers being arc-shaped, a conical roller in said housing free to roll on said bearing surface, the retaining barriers of said housing extending upwardly beyond the axis of said roller and a member extending axially through the roller and removable therefrom with its ends projecting beyond the ends of the roller and underlying portions of the inside and outside barriers.

5. A side bearing for railway cars comprising a housing adapted to be secured to the lower bolster, said housing being an integral member having its bottom forming a bearing surface and provided with side and end walls or webs having openings at the level of the bearing surface, a roller in said housing free to roll on said bearing surface, the retaining barriers of said housing extending upwardly beyond the axis of said roller and a member extending axially through the roller and removable therefrom with its ends projecting beyond the ends of the roller and underlying portions of the inside and outside webs or barriers.

6. A side bearing for railway cars comprising a housing adapted to be secured to the lower bolster and provided with side and end retaining barriers and having its bottom forming a bearing surface, a roller in said housing free to roll on said bearing surface, said side retaining barriers being provided with openings extending from the bearing surface upwardly beyond the axis of the roller, and a removable member extending axially through the roller and having portions extending beyond the ends of the roller and underlying the inside and outside barriers and accessible through the openings in said side barriers.

In testimony whereof, I have hereunto set my hand.

ARNOLD STUCKI.

Witnesses:
F. W. WINTER,
MARY E. CAHOON.